(12) United States Patent
Kamijima

(10) Patent No.: US 8,313,198 B2
(45) Date of Patent: Nov. 20, 2012

(54) PROJECTOR

(75) Inventor: Shunji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 562 days.

(21) Appl. No.: 12/504,254

(22) Filed: Jul. 16, 2009

(65) Prior Publication Data

US 2010/0020289 A1    Jan. 28, 2010

(30) Foreign Application Priority Data

Jul. 24, 2008  (JP) ................................ 2008-190549
Jun. 11, 2009  (JP) ................................ 2009-140010

(51) Int. Cl.
*G03B 21/14*    (2006.01)

(52) U.S. Cl. ............... 353/30; 353/38; 345/32; 345/39; 345/82

(58) Field of Classification Search .................... 353/31, 353/38, 94, 102; 359/28, 29, 599, 707, 558, 359/559, 567; 345/32, 39, 45–49, 55, 82, 345/83, 84; 348/801, 802
See application file for complete search history.

(56) References Cited

U.S. PATENT DOCUMENTS

| | | | |
|---|---|---|---|
| 6,412,953 B1* | 7/2002 | Tiao et al. ........................ | 353/98 |
| 6,935,749 B2* | 8/2005 | Kato ................................ | 353/38 |
| 6,988,806 B2 | 1/2006 | Slobodin et al. | |
| 7,059,728 B2* | 6/2006 | Alasaarela et al. ............... | 353/94 |
| 7,072,096 B2* | 7/2006 | Holman et al. ................ | 359/298 |
| 7,232,227 B2* | 6/2007 | Yamasaki et al. ................ | 353/94 |
| 7,303,288 B2* | 12/2007 | Miyazawa et al. ............... | 353/94 |
| 7,325,932 B2* | 2/2008 | Sakata ............................ | 353/85 |
| 7,394,841 B1 | 7/2008 | Konttinen et al. | |
| 7,410,264 B2* | 8/2008 | Yamasaki et al. ................ | 353/94 |
| 7,438,423 B2* | 10/2008 | Conner ........................... | 353/97 |
| 7,810,931 B2* | 10/2010 | Kawamura et al. .............. | 353/38 |
| 2005/0063428 A1 | 3/2005 | Anikitchev et al. | |
| 2006/0132725 A1* | 6/2006 | Terada et al. .................. | 353/102 |
| 2009/0051831 A1* | 2/2009 | Bierhuizen et al. ............... | 349/5 |
| 2009/0323030 A1* | 12/2009 | Hazama et al. ................. | 353/38 |

FOREIGN PATENT DOCUMENTS

JP    A-7-22706    1/1995
JP    U-3110203    6/2005

* cited by examiner

*Primary Examiner* — William C Dowling
(74) *Attorney, Agent, or Firm* — Oliff & Berridge, PLC

(57) ABSTRACT

A projector includes: light emitting devices provided in correspondence with pixels that form an image displayed on an illuminated surface, each of the light emitting devices emitting light modulated in accordance with an image signal; and shaping optical elements provided in correspondence with the light emitting devices, each of the shaping optical elements shaping the region illuminated with the light emitted from the corresponding light emitting device, wherein the shaping optical elements form a shaped light region in a position on the light path between the shaping optical elements and the illuminated surface.

27 Claims, 9 Drawing Sheets

PROJECTOR

BACKGROUND

1. Technical Field

The present invention relates a projector, and particularly to a technology of a projector including light emitting devices provided in correspondence with pixels that form an image displayed on an illuminated surface.

2. Related Art

Among projectors that have been proposed, most of them include a light source that supplies light, a spatial light modulator that modulates the light from the light source in accordance with an image signal, and a projection lens that projects the light modulated by the spatial light modulator. Japanese Utility Model No. 3,110,203 proposes an example of the configuration of a projector of related art. JP-A-7-22706 proposes a technology of a light emitting apparatus having a plurality of lasers arranged two-dimensionally. The light emitting apparatus according to JP-A-7-22706 is used, for example, in a projection display.

SUMMARY

Part of the light supplied from the light source is lost for several reasons: the light from the light source diverges; an illuminated region is made uniform and shaped; and the spatial light modulator performs modulation. In general, the ratio of the light used to display an image to the light emitted from the light source in a projector of related art is, for example, approximately 50% or lower. In particular, a light source that can start instantly, a light source that emits light at a large angle of radiation, and a light source having a large light emitting area loose a large amount of light. A projector is required to drastically improve its light use efficiency. It is further desired that a projector can display not only a bright image resulting from the increase in light use efficiency but also a high-quality image. When a projector includes lasers arranged two-dimensionally, the brightness of pixels can be increased, whereas dark portions are created between pixels in some cases. In this case, the dark portions between pixels tend to be noticeable relative to highly bright, point-like pixels, resulting in difficulty in providing a smooth, high-quality, two-dimensional image.

An advantage of some aspects of the invention is to provide a projector capable of not only increasing the brightness of a displayed image by increasing the light use efficiency but also keeping the image quality high.

A projector according to an aspect of the invention includes light emitting devices provided in correspondence with pixels that form an image displayed on an illuminated surface, each of the light emitting devices emitting light modulated in accordance with an image signal, and shaping optical elements provided in correspondence with the light emitting devices, each of the shaping optical elements shaping the region illuminated with the light emitted from the corresponding light emitting device. The shaping optical elements form a shaped light region in a position on the light path between the shaping optical elements and the illuminated surface.

The amount of optical element-related loss of light can be reduced and hence the light use efficiency can be significantly improved by displaying an image using the light from the light emitting devices disposed in correspondence with the pixels, as compared to a typical configuration of related art. Using the light that creates the illuminated regions shaped by the shaping optical elements to form the shaped light region makes a non-light-emitting region between adjacent pixels less noticeable, whereby a high-quality image can be provided. The resultant high light use efficiency allows the projector to display a bright, high-quality image. The "shaped light region" can be expressed as an "intermediate image." It is however noted that no images of the light emitting devices are formed in the shaped light region.

It is preferred that the projector further includes a projection system that projects the light shaped by the shaping optical elements on the illuminated surface, and the shaping optical elements form the shaped light region in a position on the light path between the shaping optical elements and the projection system. This configuration allows the shaped light region formed by the shaping optical elements to be projected on the illuminated surface.

It is preferred that the shaping optical elements cause parts of the illuminated regions created by adjacent ones of the light emitting devices to overlap with each other in the position of the shaped light region. As a result, the seam between the corresponding pixels becomes less noticeable, whereby a seamless image can be displayed. When a photo-quality image is displayed, a high-quality image can be provided in this configuration.

It is preferred that the shaping optical elements create a gap between adjacent ones of the illuminated regions in the position of the shaped light region. This configuration allows crisp display in a case where the boundary is desirably displayed clearly. This configuration is effective, for example, in high-quality presentation because texts, graphs, and other similar objects can be displayed sharply and hence the contrast is improved.

It is preferred that each of the shaping optical elements shapes the corresponding illuminated region in the position of the shaped light region into a rectangular shape. As a result, the gap between adjacent pixels is reduced, whereby a seamless image can be displayed.

It is preferred that each of the shaping optical elements converges the light emitted from the corresponding light emitting device. As a result, the illuminated region created by the light having exited from the shaping optical element can be adjusted to a desired size. Further, the diffused light from the light emitting device can be efficiently used.

It is preferred that each of the shaping optical elements diffuses the light emitted from the corresponding light emitting device. As a result, the illuminated region created by the light having exited from the shaping optical element can be adjusted to a desired size. Further, when the diameter of the light from the light emitting device is small, the size of the corresponding pixel can be enlarged to an appropriate size.

It is preferred that each of the shaping optical elements parallelizes the light emitted from the corresponding light emitting device. As a result, the light having exited from the shaping optical element can be efficiently used by a small optical system.

It is preferred that the shaping optical elements are diffraction optical elements that diffract the light emitted from the light emitting devices. As a result, the illuminated regions can be shaped and enlarged. Further, the light intensity distribution in each of the illuminated regions can be made uniform at the same time.

It is preferred that zero-order light, which is non-diffracted light, among the light having exited from each of the diffraction optical elements is directed toward a position outside the illuminated surface. If the zero-order light and the diffracted light from each of the diffraction optical elements are incident on the illuminated surface, the zero-order light overlaps with the diffracted light. In this case, only part of the corresponding illuminated region increases in brightness in some cases. When only part of the illuminated region increases in brightness, it is difficult to obtain a satisfactory light intensity distribution. A satisfactory light intensity distribution in the illuminated region can be obtained by directing the zero-order light toward a position outside the illuminated surface.

It is preferred that the principal ray of the light flux having exited from each of the light emitting devices is inclined to the optical axis of the projection system. As a result, the zero-order light can be directed toward a position outside the illuminated surface.

It is preferred that each of the shaping optical elements is a lens element that transmits the light emitted from the corresponding light emitting device. As a result, the corresponding illuminated region can be shaped and enlarged.

It is preferred that each of the shaping optical elements is a mirror element that reflects the light emitted from the corresponding light emitting device. As a result, the light path can be deflected, and the corresponding illuminated region can be shaped and enlarged.

It is preferred that the projector further includes a scatterer provided in the position of the shaped light region, the scatterer scattering the light shaped by the shaping optical elements. As a result, an excellent characteristic of the angular field of view is provided.

It is preferred that the plurality of light emitting devices are arranged two-dimensionally in a first direction and a second direction substantially perpendicular to the first direction: the light emitting devices arranged along adjacent lines spaced apart in the first direction deviate from each other in the second direction, and the light emitting devices arranged along adjacent lines spaced apart in the second direction deviate from each other in the first direction. As a result, an image having an excellent light intensity distribution can be provided.

It is preferred that the projector further includes a scan optical system provided in a position on the light path between the shaped light region and the illuminated surface, the scan optical system scanning the light shaped by the shaping optical elements on the illuminated surface. As a result, an image can be displayed by scanning the shaped light region formed by the shaping optical elements. Since the number of light emitting devices and the number of shaping optical elements can be significantly smaller than the number of pixels, the projector can be reduced in size.

It is preferred that the projector includes first light emitting devices, which are the light emitting devices that emit first color light, second light emitting devices, which are the light emitting devices that emit second color light, third light emitting devices, which are the light emitting devices that emit third color light, first shaping optical elements, which are the shaping optical elements that shape the regions illuminated with the first color light emitted from the first light emitting devices, second shaping optical elements, which are the shaping optical elements that shape the regions illuminated with the second color light emitted from the second light emitting devices, third shaping optical elements, which are the shaping optical elements that shape the regions illuminated with the third color light emitted from the third light emitting devices, and a color combining optical system that combines the first color light from the first shaping optical elements, the second color light from the second shaping optical elements, and the third color light from the third shaping optical elements. The thus configured projector can readily provide a color image. Using the configuration described above including the shaping optical elements allows the light emitted from the light emitting devices to be guided to the projection optical system more readily than in a projector of related art. Since no light source or illumination optical system is required, light source- or illumination system-related loss of the light will not be produced, and the beam shaping in the shaping optical elements allows a desired, high-quality image to be provided. Further, no illumination system leads to significant size reduction.

It is preferred that each of the light emitting devices is a surface emitting light source with a light emitting region that emits light. If each of the light emitting devices is a point light source, slight deviation of the position of the corresponding shaping optical element from the light emission point may greatly affect how the light travels in some cases. Using a surface emitting light source whose light emitting region has a certain size reduces the effect of the deviation of the position of the corresponding shaping optical element on how the light travels, as compared to the case where the light emitting device is a point light source. As a result, the alignment of the shaping optical elements can be readily carried out.

It is preferred that the light emitting region has a rectangular shape. As a result, pixels having a rectangular shape can be readily formed, and a smooth, high-quality image can be provided accordingly.

It is preferred that adjacent ones of the light emitting regions are spaced apart from each other. Providing a non-light-emitting region between adjacent ones of the light emitting regions increases the grayscale difference between the corresponding adjacent pixels, whereby an image with sharp contours can be provided.

It is preferred that an absorber that absorbs light is provided between adjacent ones of the light emitting regions. Providing the absorbers reduces the amount of light reflection in the non-light-emitting regions. Reducing the amount of light reflection in the non-light-emitting regions of the light emitting devices allows the amount of stray light to be reduced. As a result, the contrast of an image can be improved. Further, the degree of black floating that occurs when low grayscales are expressed can be reduced.

It is preferred that a scatterer that scatters light is provided between adjacent ones of the light emitting regions. Using the scatterer to scatter the light incident on the non-light-emitting region of each of the light emitting devices allows the amount of stray light to be reduced. In this way, the contrast of an image can be improved.

It is preferred that the plurality of light emitting devices are arranged in lines on a substrate and the shaping optical elements are mounted on the substrate. Providing the shaping optical elements on the substrate on which the light emitting devices are disposed allows the light emitting devices to be precisely aligned with the shaping optical elements. Further, the light emitted from the light emitting devices can be efficiently introduced in the shaping optical elements.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Embodiments of the invention will be described below in detail with reference to the drawings.

First Embodiment

Figure 1:
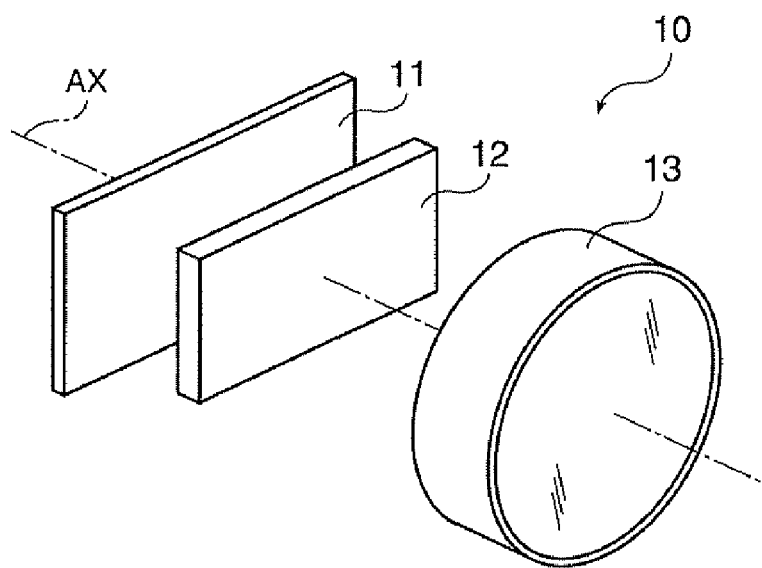
FIG. 1 shows a perspective schematic configuration of a projector according to a first embodiment.

FIG. 1 shows a perspective schematic configuration of a projector 10 according to a first embodiment of the invention. The projector 10 is a front-projection projector, which projects light on an illuminated surface of a screen (not shown) and allows a viewer who receives the light reflected off the illuminated surface to observe an image. The projector 10 includes a light emitting device array 11, a diffraction optical element array 12, and a projection system 13. The light emitting device array 11 and the diffraction optical element array 12 are disposed along the optical axis AX of the projection system 13.

Figure 2:
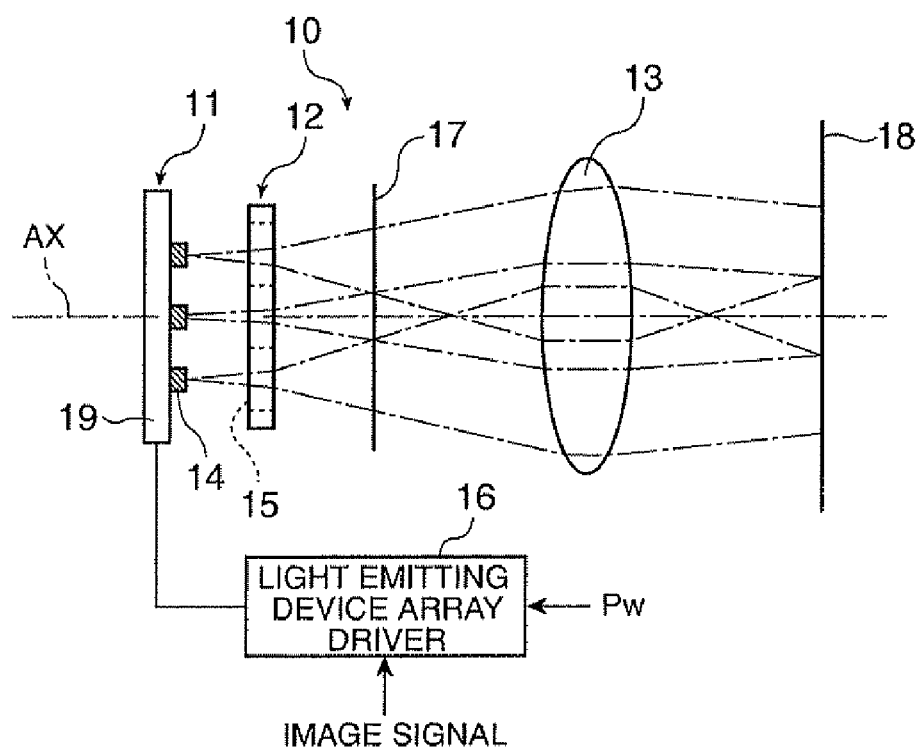
FIG. 2 diagrammatically shows the configuration of the projector.

FIG. 2 diagrammatically shows the configuration of the projector 10. The light emitting device array 11 is formed of a plurality of light emitting devices 14 arranged in a two-dimensional plane perpendicular to the optical axis AX. The plurality of light emitting devices 14 are arranged on a substrate 19. The light emitting devices 14 are disposed in correspondence with pixels that form an image displayed on an illuminated surface 18, and emit light modulated in accordance with an image signal. Each of the light emitting devices 14 is, for example, a surface emitting laser diode (LD). The modulation according to an image signal may be amplitude modulation or pulse width modulation. The diffraction optical element array 12 is, for example, a computer generated hologram (CGH).

The diffraction optical element array 12 has a plurality of diffraction optical elements 15 arranged two-dimensionally in correspondence with the light emitting devices 14, and the diffraction optical elements 15 diffract and diffuse the light emitted from the light emitting devices 14. Each of the diffraction optical elements 15 functions as a shaping optical element that shapes the region illuminated with the light emitted from the corresponding light emitting device 14. The light emitting devices 14 in the light emitting device array 11 and the diffraction optical elements 15 in the diffraction optical element array 12 are disposed in correspondence with each other in such a way that the two-dimensional positions of the light emitting devices 14 coincide with those of the diffraction optical elements 15.

Minute protrusions and depressions are formed in part of the surface of each of the diffraction optical elements 15, for example, part of the light-exiting surface through which light exits. The portion where the minute protrusions and depressions are formed is the portion where the laser light from the corresponding light emitting device 14 produces a light spot. The minute protrusions and depressions on each of the diffraction optical elements 15 spatially change the phase of the laser light to produce diffracted light. Each of the diffraction optical elements 15 is configured to have a function of shaping the corresponding illuminated region into a desired shape by optimizing surface conditions including the spacings between the protrusions and depressions and the height thereof. A designing method for optimizing the surface conditions of each of the diffraction optical elements 15 is a predetermined operation method (simulation method), such as iterative Fourier transform.

The diffraction optical elements 15 in the diffraction optical element array 12 diffract the light to form a shaped light region in a predetermined position 17. The shaped light region is an image based on which an image is displayed on the illuminated surface 18. The predetermined position 17 where the shaped light region is formed is a position on the light path between the diffraction optical element array 12 and the projection system 13. The predetermined position 17 is conjugate to the illuminated surface 18. The "shaped light region" can be expressed as an "intermediate image." It is however noted that no images of the light emitting devices 14 are formed in the shaped light region. For example, the diffraction optical element array 12 is manufactured by forming a mold (die) having a desired shape and then transferring the shape of the mold to a substrate in the presence of heat. This procedure is called nanoimprinting. Any other method for manufacturing the diffraction optical element array 12, such as interference exposure, which has been conventionally used, may be employed as long as the method is capable of forming the diffraction optical elements 15 having a desired shape.

The projection system 13 projects the shaped light region (image), which is formed in the predetermined position 17 by the light shaped by the diffraction optical elements 15, on the illuminated surface 18. A light emitting device array driver 16 uses electric power Pw supplied from a power source (not shown) to drive the light emitting device array 11. The light emitting device array driver 16 drives each of the light emitting devices 14 in the light emitting device array 11 in accordance with an image signal inputted from, for example, an external apparatus (not shown).

Figure 3:
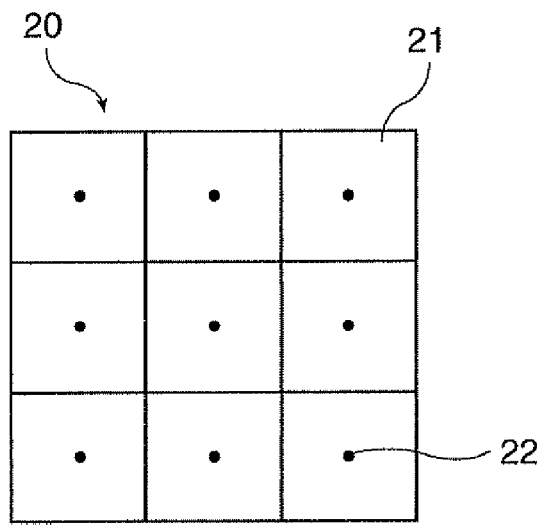
FIG. 3 describes how diffraction optical elements shape illuminated regions.

FIG. 3 describes how illuminated regions 21 are shaped by the diffraction optical elements 15 and shows part of a shaped light region 20. In the shaped light region 20, each of the illuminated regions 21 has a rectangular shape. Each of the diffraction optical elements 15 not only enlarges the light from the corresponding light emitting device 14 to form the corresponding illuminated region 21 in the shaped light region 20 but also shapes the light into a rectangular shape. Each of the diffraction optical elements 15 makes the light intensity distribution in the corresponding illuminated region 21 uniform. The light emitted from the light emission center of each of the light emitting devices 14 travels in parallel to the optical axis AX and impinges on the center 22 of the corresponding illuminated region 21. The boundaries of adjacent illuminated regions 21 substantially coincide with each other. The projection system 13 focuses the shaped light region 20 on the illuminated surface 18. Each of the illuminated regions 21 in the shaped light region 20 forms the corresponding one of the pixels of an image displayed on the illuminated surface 18. Shaping each of the illuminated regions 21 into a rectangular shape reduces the gap between adjacent pixels, whereby a seamless image can be displayed.

In the projector 10, the amount of optical element-related loss of light can be reduced and hence the light use efficiency can be significantly improved by displaying an image using the light from the light emitting devices 14 disposed in correspondence with the pixels, as compared to a typical configuration of related art. Even when LDs, which can start instantly, are used, the amount of light loss can be reduced than that in related art. The light emitting devices 14 in the light emitting device array 11 are arranged at certain spacings in consideration of the layout of wiring lines used for driving the light emitting devices 14, adequate cooling, and other factors. Using the light that creates the illuminated regions 21 shaped by the shaping optical elements to form the shaped light region 20 reduces the gap between adjacent pixels, whereby a high-quality image can be provided. The resultant high light use efficiency advantageously allows a bright, high-quality image to be displayed. Higher light use efficiency also allows the projector 10 to consume a smaller amount of electric power.

In the projector 10, speckle noise can also be advantageously reduced when the laser light emitted from the plurality of light emitting devices 14 has a certain spectral width. Each of the light emitting devices 14 is not limited to an LD but may be any of a light emitting diode (LED), a superluminescent diode (SLD), an electroluminescent (EL) devices and other semiconductor devices.

Second Embodiment

Figure 4:
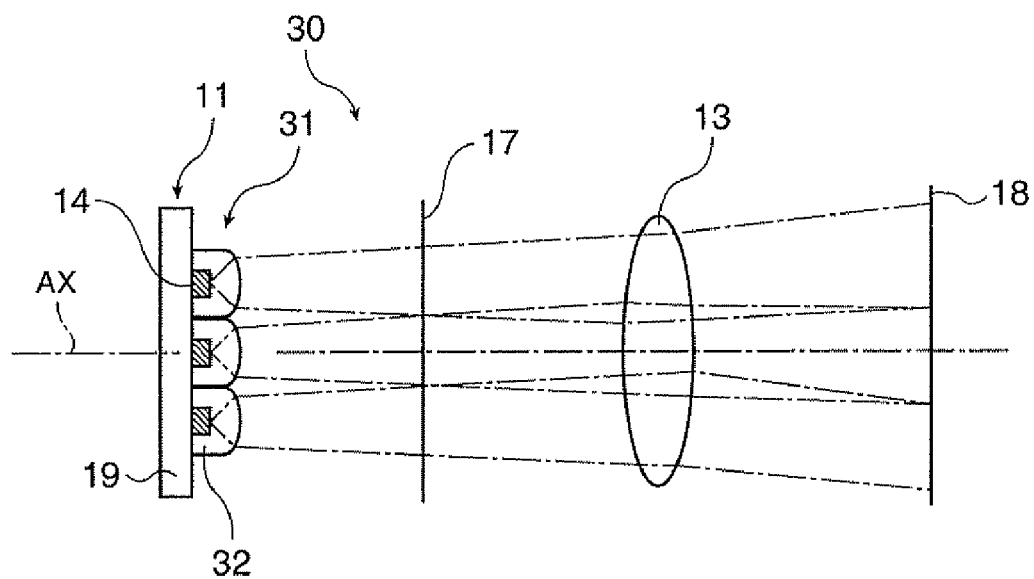
FIG. 4 diagrammatically shows the configuration of a projector according to a second embodiment.

FIG. 4 diagrammatically shows the configuration of a projector 30 according to a second embodiment of the invention. The projector 30 according to the present embodiment is characterized in that a microlens array 31 is provided. The portions that are the same as those in the first embodiment described above have the same reference characters, and no description of the redundant portions will be made. The microlens array 31 has a plurality of lens elements 32 arranged two-dimensionally in correspondence with the light emitting devices 14. The lens elements 32 transmit the light emitted from the light emitting devices 14. Each of the lens elements 32 functions as a shaping optical element that shapes the region illuminated with the light emitted from the corresponding light emitting device 14. Each of the lens elements 32 is formed of a convex surface having a spherical or aspherical shape. Using nanoimprinting to form the lens elements 32 on the light emitting devices 14 allows the lens elements 32 to be formed in a position close to the light emission positions, whereby the amount of loss of the light emitted from the light emitting devices 14 can be reduced. As a result, a desired shape of the light can be provided by efficient beam shaping, and the light use efficiency can be increased at the same time. The microlens array 31 may alternatively be configured in the form of a lens element substrate having a plurality of lenses integrally molded. Aligning the microlens array 31 with the light emitting device substrate in a single operation allows the number of assembly steps to be reduced and precise alignment to be achieved. The ideal beam shaping contributes to higher efficiency and higher image quality.

The lens elements 32 are mounted on the substrate 19. Providing the lens elements 32 in such a way that each of them covers the front and side surfaces of corresponding light emitting device 14 allows the diffused light from the light emitting device 14 to be efficiently introduced into the lens element 32. Providing the lens elements 32 on the substrate 19 on which the light emitting devices 14 are mounted allows the light emitting devices 14 to be precisely aligned with the lens elements 32. The microlens array 31 can be precisely positioned with respect to the light emitting device array 11 in such a way that the light emitting devices 14 face the lens elements 32.

The diffused light from each of the light emitting devices 14 is refracted and converged by the corresponding lens element 32 and forms a predetermined illuminated region in the predetermined position 17. The converging action of each of the lens elements 32 allows the illuminated region to be adjusted to a desired size. The converging action also allows the diffused light from each of the light emitting devices 14 to travel efficiently toward the projection system 13. As a result, the light can be efficiently used. The configuration in which each of the lens elements 32 covers the front and side surfaces of the corresponding light emitting device 14 is suitable for a case where each of the light emitting devices 14 emits light having low directivity, for example, a case where each of the light emitting devices 14 is an LED. When each of the light emitting devices 14 emits light having high directivity, the corresponding lens element 32 may be disposed in such a way that it does not cover the side surfaces of the light emitting device 14 but only covers the front surface thereof.

Figure 5:
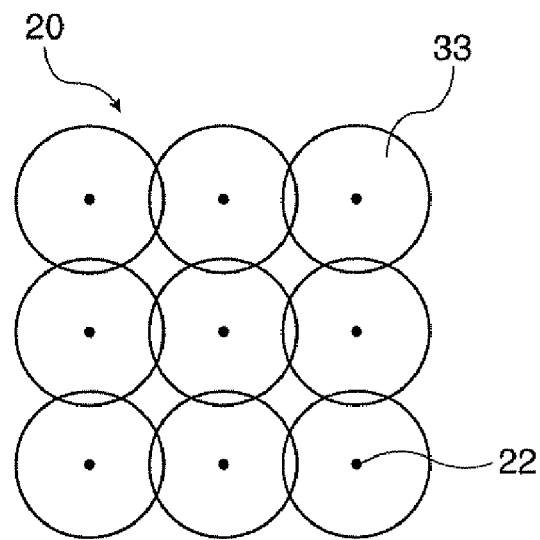
FIG. 5 describes how lens elements shape illuminated regions.

FIG. 5 describes how the lens elements 32 shape illuminated region 33 and shows part of the shaped light region 20. In the shaped light region 20, each of the illuminated regions 33 has a circular shape. Each of the lens elements 32 not only enlarges the light from the corresponding light emitting device 14 to form the corresponding illuminated region 33 in the shaped light region 20 but also shapes the light into a circular shape. Further, the lens elements 32 cause parts of the illuminated regions 33 created by adjacent light emitting devices 14 to overlap with each other in the position of the shaped light region 20. As a result, the seam between the corresponding pixels becomes less noticeable, whereby a seamless image can be displayed. Each of the lens elements 32, which functions as the shaping optical element, may have another function of scattering light. To this end, for example, each of the lens elements 32 may have a light scattering material dispersed therein, or may have a scattering surface with minute irregularities formed thereon. The lens elements 32 described above may be used to scatter light so that parts of adjacent illuminated regions 33 overlap with each other.

Figure 6:
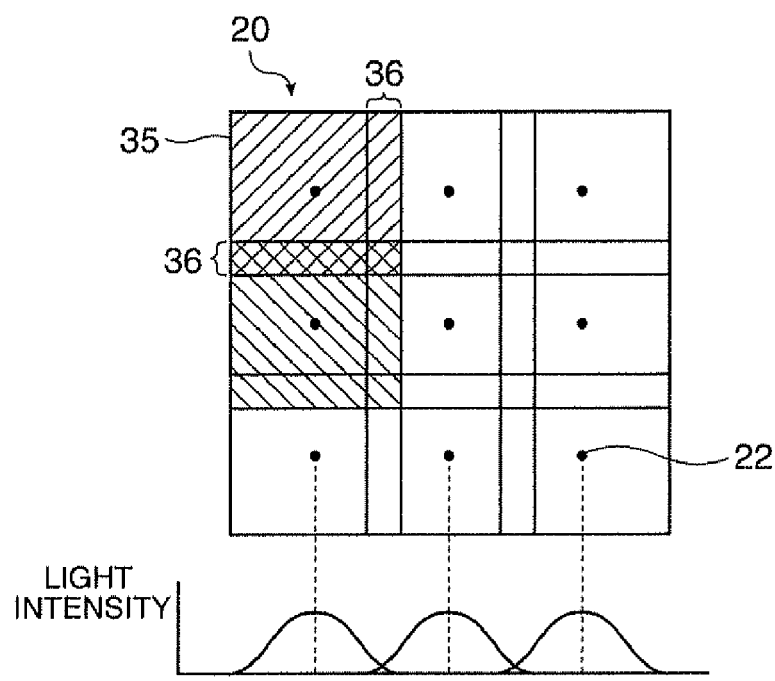
FIG. 6 describes illuminated regions according to a first variation and the light intensity distribution thereof.

FIG. 6 describes illuminated regions 35 according to a first variation and the light intensity distribution thereof. In the shaped light region 20, each of the illuminated regions 35 has a rectangular shape. In the present variation, overlap regions 36 where the illuminated regions 35 overlap with each other are formed in both directions in which the illuminated regions 35 are arranged two-dimensionally. The shaping optical elements cause parts of the illuminated regions 35 that are created by adjacent light emitting devices 14 to overlap with each other in the position of the shaped light region 20. In this case, the seam between the corresponding pixels becomes further less noticeable, whereby a seamless image can be displayed. When each of the illuminated regions 35 has a light intensity distribution in which the light intensity decreases with distance from the center 22, the light intensity distribution of the shaped light region 20 can be advantageously made uniform by using the low light intensity peripheries of the illuminated regions 35 to form the overlap regions 36. When a photo-quality image is displayed, a high-quality image can be provided in this configuration.

Figure 7:
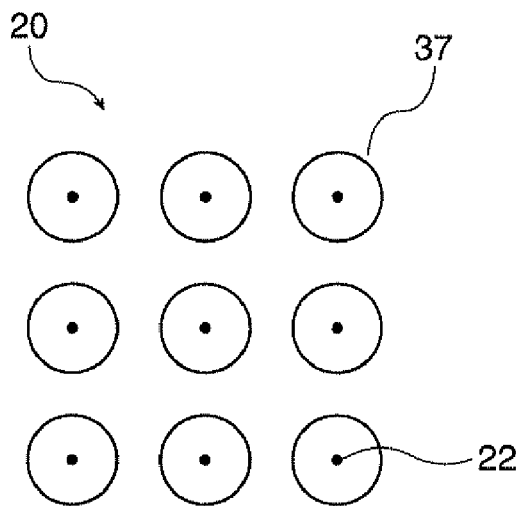
FIG. 7 describes illuminated regions according to a second variation.

FIG. 7 describes illuminated regions 37 according to a second variation. In the shaped light region 20, each of the illuminated regions 37 has a circular shape. In the present variation, the shaping optical elements create gaps between the illuminated regions 37 in the position of the shaped light region 20. Each of the illuminated regions 37 has a dot-like shape in the position of the shaped light region 20. This configuration allows crisp display in a case where the boundary is desirably displayed clearly. The configuration in the present variation is effective, for example, in high-quality presentation because texts, graphs, and other similar objects can be displayed sharply and hence the contrast is improved. When each of the illuminated regions has a rectangular shape as well, gaps may be provided between the illuminated regions. In each of the embodiments that have been described above and will be described below, how to shape illuminated regions by using shaping optical elements may be arbitrarily determined in consideration of the purpose for which the projector is used and the object to be displayed.

Figure 15:
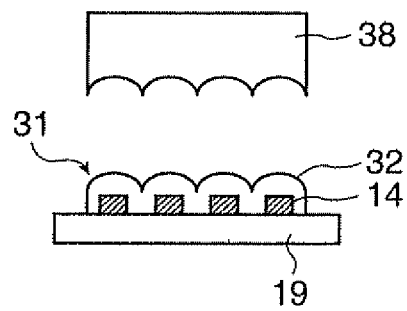
FIG. 15 describes how to mount a microlens array on a substrate.

FIG. 15 describes how to mount the microlens array 31 on the substrate 19. A desired shape of the microlens array 31 is formed on a die 38. A resin or a sol-gel material of which the microlens array 31 is made is applied onto the substrate 19 on which the light emitting devices 14 are formed, and then the die 38 is pressed against the applied material. The shape of the die 38 is thus transferred to the material, and the microlens array 31 mounted on the substrate 19 is obtained.

The shaping optical elements mounted on the substrate 19 are not limited to the lens elements 32. The shaping optical elements mounted on the substrate 19 may be a diffraction optical element or a Fresnel lens. When a CGH or a Fresnel lens, which is a diffraction optical element, is mounted as well, it can be precisely aligned with the light emitting devices 14, whereby the light emitted from the light emitting devices 14 can be efficiently shaped. A CGH or a Fresnel lens is also mounted on the substrate 19 by applying a material onto the substrate 19 and transferring the shape of the die.

A Fresnel lens diffracts the light from the light emitting devices 14 to shape the illuminated regions. To diffract light by using a Fresnel lens, surface illumination is required so that a certain area of the Fresnel lens is illuminated with light. To this end, light emitting devices 14 that can be combined with the Fresnel lens are LEDs or any other device that emits diffused light.

Third Embodiment

Figure 8:
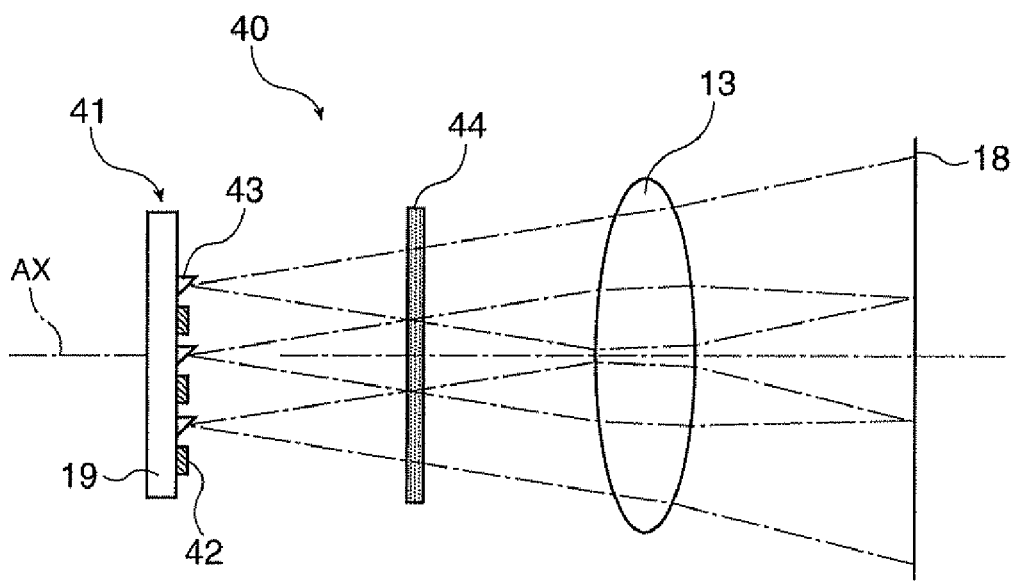
FIG. 8 diagrammatically shows the configuration of a projector according to a third embodiment.

FIG. 8 diagrammatically shows the configuration of a projector 40 according to a third embodiment of the invention. In the present embodiment, light emitting devices 42 that form a light emitting device array 41 are edge emitting LDs. The portions that are the same as those in the first embodiment described above have the same reference characters, and no description of the redundant portions will be made. A mirror element 43 is provided on the light emitting device array 41 for each of the light emitting devices 42. The mirror element 43 reflects the light emitted from the corresponding light emitting device 42. The mirror element 43 functions as a shaping optical element that shapes the region illuminated with the light emitted from the light emitting device 42. The reflection surface of the mirror element 43 has a convex surface having a spherical or aspherical shape and diffuses the light emitted from the light emitting device 42. The mirror element 43 is formed by depositing a highly reflective metal material or forming a dielectric multilayer film on a substrate having a desired shape.

A scattering plate 44 is provided in the position of the shaped light region formed by the mirror elements 43. The scattering plate 44 functions as a scatterer that scatters the light shaped by the mirror elements 43. The scattering plate 44 is a plate-shaped member formed by dispersing a light scattering material in a transparent member. The light scattered by the scattering plate 44 results in an excellent characteristic of the angular field of view. Further, since the scattering plate 44 disperses the energy of light, no problem will occur, for example, no adverse effect on the eyes will be produced, even if a viewer on the side toward which the projector 40 outputs light looks at the optical system. Accordingly, the projector 40 can be configured to include a high-power light emitting device 42.

Figure 9:
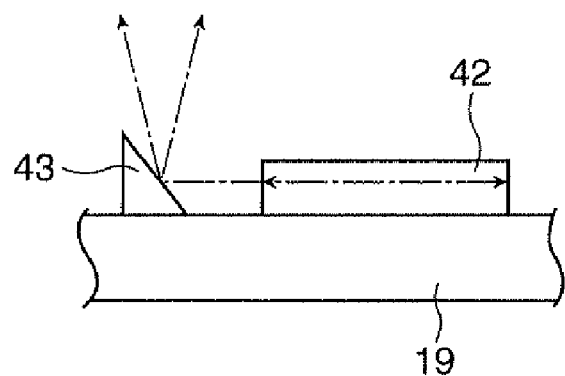
FIG. 9 describes the configuration of a light emitting device and a mirror element.

FIG. 9 describes the configuration of one of the light emitting devices 42 and the corresponding mirror element 43. The lasing light produced when resonance occurs in the active layer of the light emitting device 42 exits in the direction along the surface of the light emitting device array 41 on which light emitting device 42 is disposed. The light emitted the light emitting device 42 is reflected off the mirror element 43, where the light path is deflected, and travels toward the scattering plate 44. The light emitted from the light emitting device 42 and reflected off the convex surface of the mirror element 43 is enlarged so that an illuminated region is formed in the shaped light region.

Figure 10:
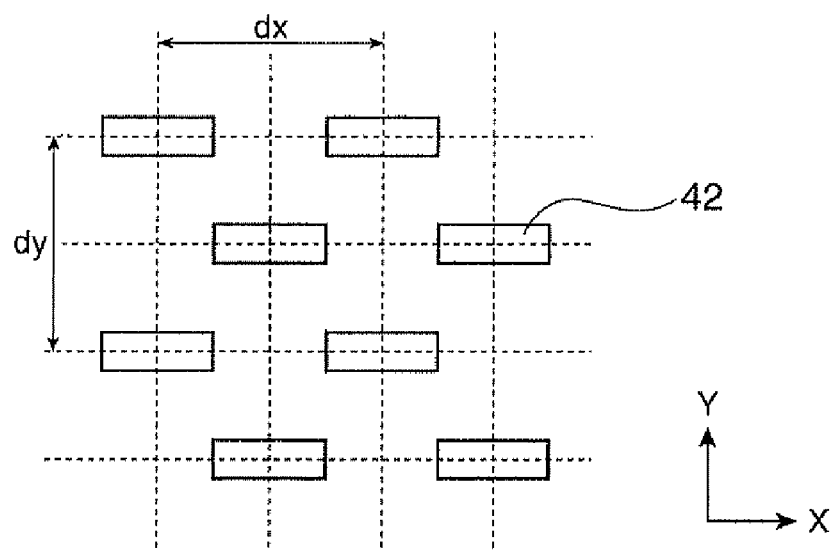
FIG. 10 describes a two-dimensional arrangement of light emitting devices on a light emitting device array.

FIG. 10 describes the two-dimensional arrangement of the light emitting devices 42 on the light emitting device array 41. In FIG. 10, only the light emitting devices 42 are illustrated. In the plane of FIG. 10, each of the light emitting devices 42 is elongated in one of the two directions perpendicular to each other. The light emitting devices 42 are disposed in such a way that the longer sides thereof are oriented in one direction. It is assumed that the X direction, which is a first direction, is parallel to the longer side of each of the light emitting devices 42, and the Y direction, which is a second direction, is perpendicular to the X direction. Optical resonance occurs in the X direction in each of the light emitting devices 42. A plurality of light emitting devices 42 are arranged two-dimensionally in the X and Y directions. The broken lines shown in FIG. 10 indicate lines along which the light emitting devices 42 are arranged in the X and Y directions.

The light emitting devices 42 arranged along adjacent lines spaced apart in the X direction deviate from each other in the Y direction by one-half the spacing (dy/2). Similarly, the light emitting devices 42 arranged along adjacent lines spaced apart in the Y direction deviate from each other in the X direction by one-half the spacing (dx/2). Arranging the light emitting devices 42 with their positions deviating from each other allows the light emitting device array 41 to be more efficiently cooled, which contributes to higher efficiency of the light emitting devices 42. Further, since an optical element patterned region that relates the shaping optical elements to the light emitting devices 42 has larger interspaces, the assembling workability can be significantly improved.

Figure 11:
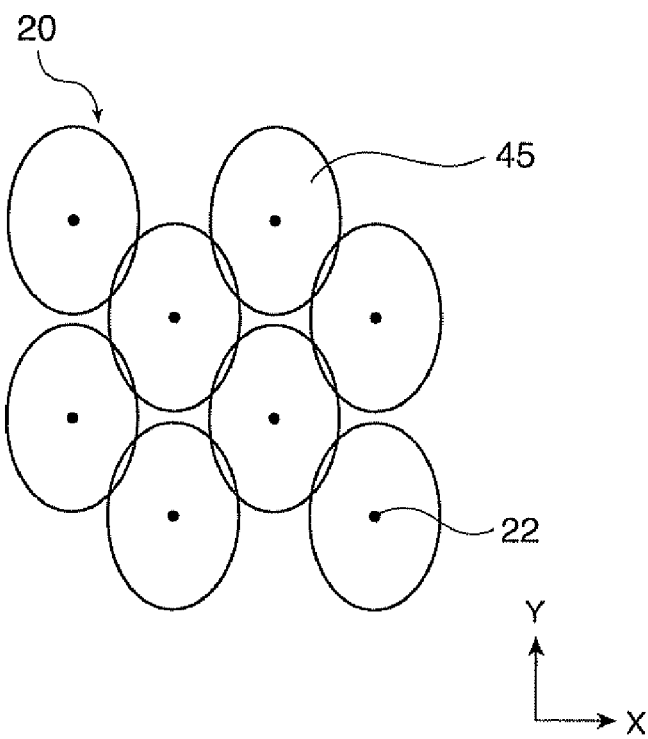
FIG. 11 describes the shape of illuminated regions in a shaped light region.

FIG. 11 describes the shape of illuminated regions 45 in the shaped light region 20 and shows part of the shaped light region 20. In the shaped light region 20, each of the illuminated regions 45 has an elliptical shape whose major axis is oriented in the Y direction. As described above, arranging the light emitting devices 42 in such a way that those in adjacent lines deviate from each other in the X and Y directions by one-half the respective spacings allows the gap between adjacent illuminated regions 45 to be reduced in size, whereby an image having an excellent light intensity distribution can be provided. The light emitting devices 42 arranged along adjacent lines spaced apart in the X direction only need to deviate from each other in the Y direction, and the deviation is not limited to one-half the spacing. Similarly, the light emitting devices 42 arranged along adjacent lines spaced apart in the Y direction only need to deviate from each other in the X direction, and the deviation is not limited to one-half the spacing.

Each of the mirror elements 43 may have a shape having different curvatures in two directions perpendicular to each other, whereby the shape of the corresponding illuminated region 45 is deformed as appropriate. For example, the shape of the illuminated region 45 may be adjusted to a shape close to a circle by increasing the degree of light diffusion in the X direction than in the Y direction. The present embodiment is useful to provide a region that allows optical resonance to occur in the direction parallel to the surface that forms the light emitting device array 41 but where the light emitting devices 42 are arranged. Each of the light emitting devices 42 is not limited to an edge emitting LD but may be an edge emitting SLD. In other embodiments as well, the aspect ratio of each of the illuminated regions may be adjusted by deforming the corresponding shaping optical element as appropriate.

The scattering plate 44 does not necessarily have a scattering material dispersed therein, but may have a scattering surface with minute irregularities formed thereon. The scatterer is not limited to the scattering plate 44, but may be any component that scatters light. For example, the scatterer may be a light scattering component having a reflection surface with minute irregularities formed thereon. The projectors according to other embodiments may also include a scatterer in the position of the shaped light region. Further, each of the mirror elements 43, which functions as the shaping optical element, may have another function of scattering light. For example, each of the mirror elements 43 may have a reflection surface with minute irregularities that scatter light. Moreover, the mirror elements 43 that scatter light may be used to cause parts of adjacent illuminated regions 45 to overlap with each other.

Fourth Embodiment

Figure 12:
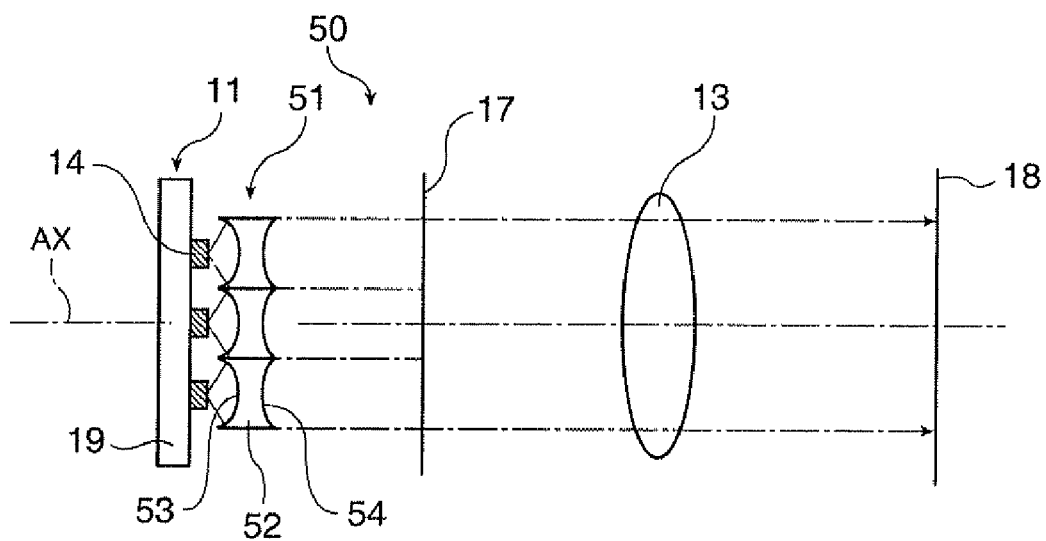
FIG. 12 diagrammatically shows the configuration of a projector according to a fourth embodiment.

FIG. 12 diagrammatically shows the configuration of a projector 50 according to a fourth embodiment of the invention. The projector 50 according to the present embodiment is characterized in that a microlens array 51 that parallelizes light is provided. The portions that are the same as those in the first embodiment described above have the same reference characters, and no description of the redundant portions will be made. The microlens array 51 has a plurality of lens elements 52 arranged two-dimensionally in correspondence with the light emitting devices 14. Each of the lens elements 52 functions as a shaping optical element that shapes the region illuminated with the light emitted from the corresponding light emitting device 14.

The lens elements 52 are disposed in front of the light emitting devices 14 and transmit the light emitted therefrom. A light-incident surface 53 that forms each of the lens elements 52 and on which the light from the corresponding light emitting device 14 is incident has a concave surface having a spherical or aspherical shape. The diffused light from the light emitting device 14 is refracted and converged at the light-incident surface 53. A light-exiting surface 54 that forms the lens element 52 and through which the light exits has a concave surface having a spherical or aspherical shape. The light passing through the lens element 52 is refracted and parallelized at the light-exiting surface 54. Each of the lens elements 52 may be configured in such a way that the light-incident surface 53 covers the front and side surfaces of the corresponding light emitting device 14 in order to efficiently collect the diffused light from the light emitting device 14.

Using the lens elements 52 to parallelize the light allows the light having exited through the microlens array 51 to be efficiently used by a small optical system. For example, a small projection system 13 can be used to display a bright image. The shape of each of the lens elements 52, which is configured in such a way that the light-incident surface 53 converges light and the light-exiting surface 54 parallelizes light independently, can be readily adjusted, whereby the yield can be improved. Each of the lens elements 52 may alternatively be configured in such a way that one of the light-incident surface 53 and the light-exiting surface 54 is used to converge and parallelize light.

Each of the lens elements 52 is not limited to an optical element that parallelizes light, but may be any other optical element having the light-incident surface 53 and the light-exiting surface 54 that can shape the corresponding illuminated region. For example, each of the lens elements 52 may use the light-incident surface 53 and the light-exiting surface 54 to converge or diffuse light. The light-incident surface 53 and the light-exiting surface 54 of each of the lens elements 52 do not necessarily have concave surfaces, but at least one of the light-incident surface 53 and the light-exiting surface 54 may have a concave or convex surface. Further, each of the lens elements 52, which functions as the shaping optical element, may have another function of scattering light.

Fifth Embodiment

Figure 13:
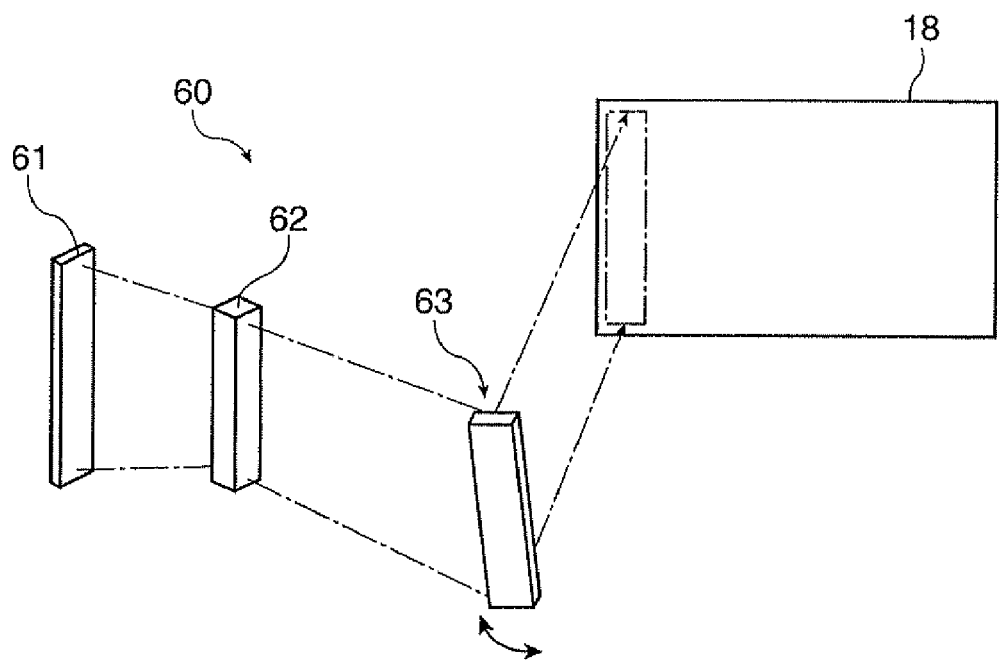
FIG. 13 shows a schematic configuration of a projector according to a fifth embodiment.

FIG. 13 shows a schematic configuration of a projector 60 according to a fifth embodiment of the invention. The projector 60 according to the present embodiment is characterized in that a scan system 63 scans the light shaped by the shaping optical elements. The portions that are the same as those in the first embodiment described above have the same reference characters, and no description of the redundant portions will be made. A light emitting device array 61 has a plurality of light emitting devices (not shown) arranged in a single specific direction.

A diffraction optical element array 62 has a plurality of diffraction optical elements (not shown) arranged in a single specific direction in correspondence with the light emitting devices, and the diffraction optical elements diffract the light emitted from the light emitting devices. Each of the diffraction optical elements functions as a shaping optical element that shapes the region illuminated with the light emitted from the corresponding light emitting device. The light emitting devices in the light emitting device array 61 and the diffraction optical elements in the diffraction optical element array 62 are disposed in correspondence with each other in such a way that the positions of the light emitting devices in the specific direction described above coincide with those of the diffraction optical elements.

The diffraction optical elements in the diffraction optical element array 62 diffract the light to form a shaped light region in a predetermined position. The predetermined position where the shaped light region is formed is a position on the light path between the diffraction optical element array 62 and the scan system 63. The scan system 63 is disposed in a position on the light path between the shaped light region and the illuminated surface 18. The scan system 63 scans the light shaped by the diffraction optical elements on the illuminated surface 18. The scan system 63 is, for example, a galvanometric mirror.

The projector 60 displays an image on the illuminated surface 18 by scanning the light in the direction substantially perpendicular to the direction in which the illuminated regions created by the light emitting devices are arranged. In the present embodiment, since the number of light emitting devices and the number of diffraction optical elements can be significantly smaller than the number of pixels, the projector 60 can be reduced in size. Further, the fact that the number of light emitting devices decreases contributes to improvement in yield. The scan system 63 may alternatively be a polygonal mirror, an acousto-optical deflector (AOD), or any other component that scans light in a single specific direction. The projector 60 does not necessarily use diffraction optical elements as the shaping optical elements, but may use lens elements or mirror elements, which are other examples of shaping optical elements having been described in the above embodiments.

Sixth Embodiment

Figure 14:
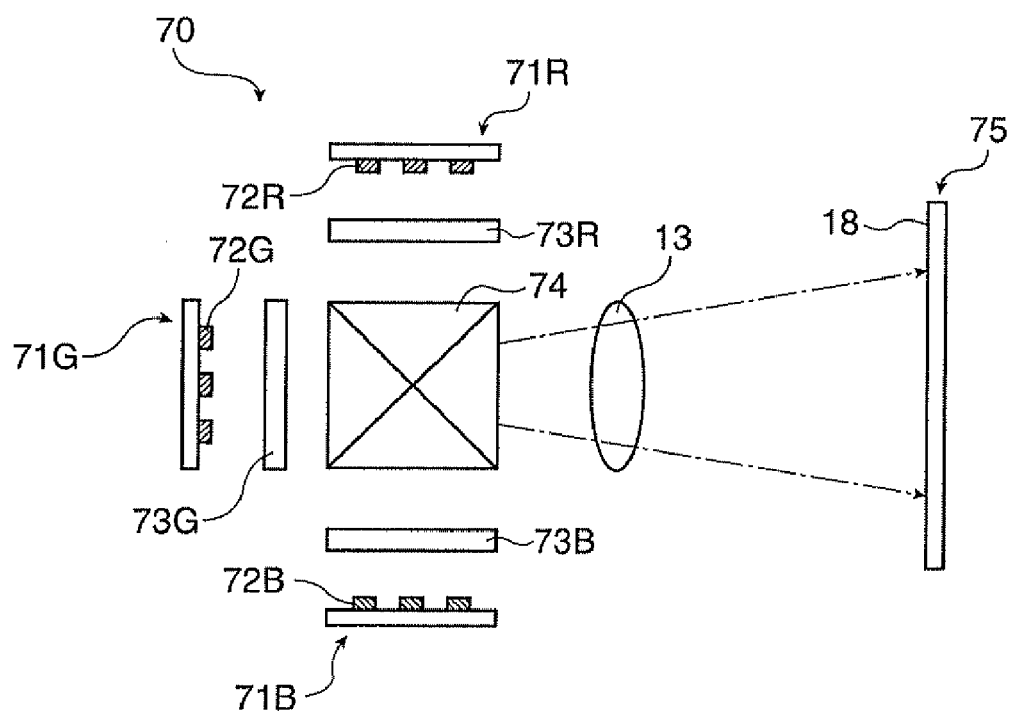
FIG. 14 diagrammatically shows the configuration of a projector according to a sixth embodiment.

FIG. 14 diagrammatically shows the configuration of a projector 70 according to a sixth embodiment of the invention. The projector 70 includes a light emitting device array for red (R) light 71R, a light emitting device array for green (R) light 71G, and a light emitting device array for blue (R) light 71B. The light emitting device array for R light 71R has a plurality of light emitting devices for R light 72R arranged two-dimensionally. The light emitting devices for R light 72R are disposed in correspondence with pixels. The light emitting devices for R light 72R are first light emitting devices that emit R light, which is first color light, modulated in accordance with an image signal.

A diffraction optical element array for R light 73R has a plurality of diffraction optical elements (not shown) arranged in lines in correspondence with the light emitting devices for R light 72R, and the diffraction optical elements diffract the R light emitted from the light emitting devices for R light 72R. Each of the diffraction optical elements in the diffraction optical element array for R light 73R functions as a first shaping optical element that shapes the region illuminated with the R light emitted from the corresponding light emitting device for R light 72R. The diffraction optical elements in the diffraction optical element array for R light 73R diffract the light to form a shaped light region in a predetermined position between the diffraction optical element array for R light 73R and a cross dichroic prism 74.

The light emitting device array for G light 71G has a plurality of light emitting devices for G light 72G arranged in lines in two-dimensional directions. The light emitting devices for G light 72G are disposed in correspondence with the pixels. The light emitting devices for G light 72G are second light emitting devices that emit G light, which is second color light, modulated in accordance with the image signal. A diffraction optical element array for G light 73G has a plurality of diffraction optical elements (not shown) arranged in correspondence with the light emitting devices for G light 72G, and the diffraction optical elements diffract the G light emitted from the light emitting devices for G light 72G. Each of the diffraction optical elements in the diffraction optical element array for G light 73G functions as a second shaping optical element that shapes the region illuminated with the G light emitted from the corresponding light emitting device for G light 72G. The diffraction optical elements in the diffraction optical element array for G light 73G diffract the light to form a shaped light region in a predetermined position between the diffraction optical element array for G light 73G and the cross dichroic prism 74.

The light emitting device array for B light 71B has a plurality of light emitting devices for B light 72B arranged in lines in two-dimensional directions. The light emitting devices for B light 72B are disposed in correspondence with the pixels. The light emitting devices for B light 72B are third light emitting devices that emit B light, which is third color light, modulated in accordance with the image signal. A diffraction optical element array for B light 73B has a plurality of diffraction optical elements (not shown) arranged in lines in correspondence with the light emitting devices for B light 72B, and the diffraction optical elements diffract the B light emitted from the light emitting devices for B light 72B. Each of the diffraction optical elements in the diffraction optical element array for B light 73B functions as a third shaping optical element that shapes the region illuminated with the B light emitted from the corresponding light emitting device for B light 72B. The diffraction optical elements in the diffraction optical element array for B light 73B diffract the light to form a shaped light region in a predetermined position between the diffraction optical element array for B light 73B and the cross dichroic prism 74.

The cross dichroic prism 74 functions as a light combining system that combines the R light from the diffraction optical element array for R light 73R, the G light from the diffraction optical element array for G light 73G, and the B light from the diffraction optical element array for B light 73B. The cross dichroic prism 74 combines the R light, the G light, and the B light incident from different directions and directs the combined light toward the projection system 13. The projection system 13 projects the combined light in the cross dichroic prism 74 on the illuminated surface 18 of a screen 75. The thus configured projector 70 according to the present embodiment can readily provide a color image. The projector 70 does not necessarily use the diffraction optical elements as the shaping optical elements, but may use lens elements or mirror elements, which are other examples of the shaping optical elements having been described in the above embodiments.

Further, the projector 70 may have a configuration in which the shaping optical elements for each of the colors are integrated with the corresponding light emitting device substrate on which the light emitting devices for that color are mounted. Arranging the shaping optical elements in the vicinity of the light emitting devices allows the light emitting devices to form pixels having a desired shape with precision. More desirably, the shaping optical elements may be integrally molded with the light emitting devices. In this way, the shaping optical elements can be positioned with respect to the light emitting devices with higher precision, whereby the projection variation among the shaping optical elements can be reduced and a high-quality image can be provided accordingly.

Seventh Embodiment

Figure 16:
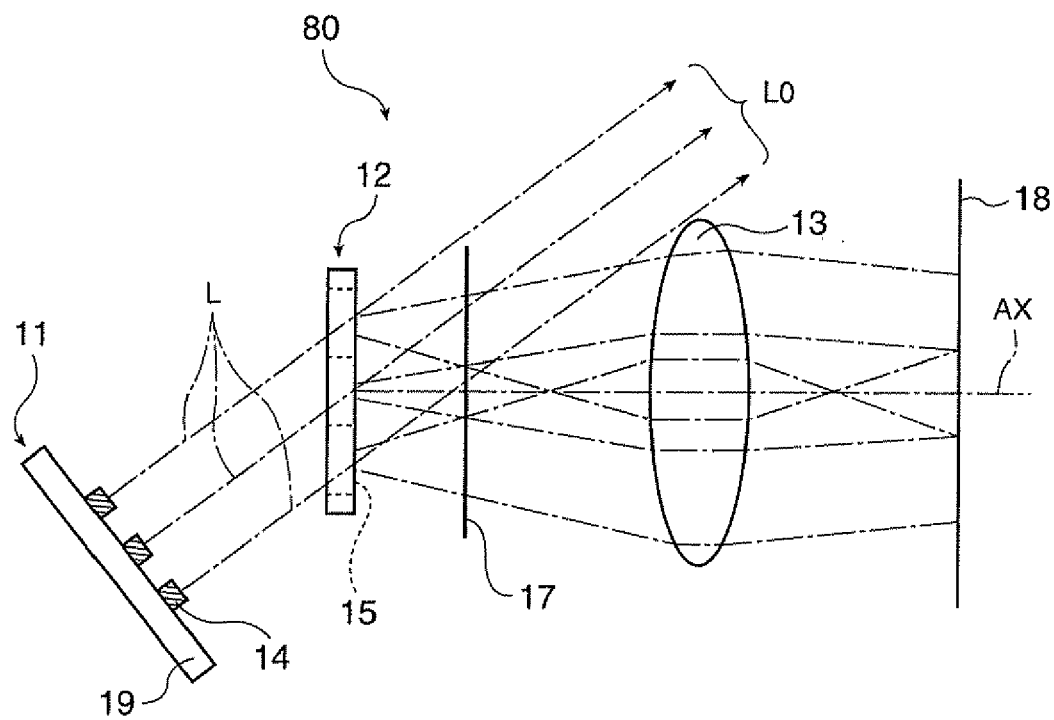
FIG. 16 diagrammatically shows the configuration of a projector according to a seventh embodiment.

FIG. 16 diagrammatically shows the configuration of a projector 80 according to a seventh embodiment of the invention. The diffraction optical elements 15 output zero-order light L0, which is the light other than diffracted light. The zero-order light L0 is the light that has not been diffracted by the diffraction optical elements 15 but has transmitted therethrough. The projector 80 according to the present embodiment is characterized in that the zero-order light L0 having exited from each of the diffraction optical elements 15 is directed toward a position outside the illuminated surface 18. The portions that are the same as those in the first embodiment described above have the same reference characters, and no description of the redundant portions will be made.

The light emitting device array 11 is disposed in such a way that the substrate 19 is inclined to the optical axis AX. The principal ray L of the light flux having exited from each of the light emitting devices 14 is inclined to the optical axis AX. Each of the diffraction optical elements 15 uses diffracted light, such as first-order diffracted light, to shape the corresponding illuminated region. The diffracted light from the diffraction optical elements 15 travels through the projection system 13 toward the illuminated surface 18. The zero-order light L0 having exited from each of the diffraction optical elements 15 travels along the extension of the principal ray L of the light flux from the corresponding light emitting device 14 toward a position outside the illuminated surface 18.

If the zero-order light L0 and the diffracted light from each of the diffraction optical elements 15 are incident on the illuminated surface 18, the zero-order light L0 overlaps with the diffracted light. In this case, only part of the corresponding illuminated region increases in brightness in some cases. When only part of the illuminated region increases in brightness, it is difficult to obtain a satisfactory light intensity distribution. A satisfactory light intensity distribution in the illuminated region can be obtained by directing the zero-order light toward a position outside the illuminated surface 18. Alternatively, a light absorbing member may be provided in the position on which the zero-order light L0 having exited from each of the diffraction optical elements 15 is incident. In this way, the amount of stray light can be reduced.

Eighth Embodiment

Figure 17:
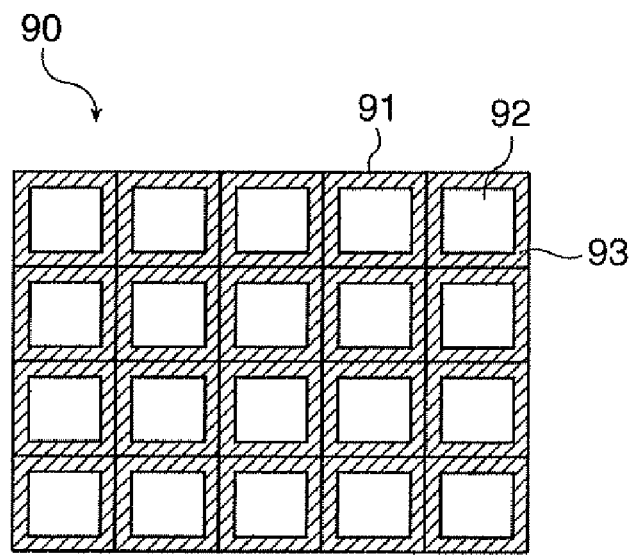
FIG. 17 shows a plan schematic configuration of a light emitting device array according to an eighth embodiment.

FIG. 17 shows a plan schematic configuration of a light emitting device array 90 according to an eighth embodiment of the invention. The present embodiment is characterized in that each light emitting device 91 that forms the light emitting device array 90 is a surface emitting light source. Each of the light emitting devices 91 is, for example, an LED. Each of the light emitting devices 91 has a light emitting region 92 that emits light. The light emitting region 92 of each of the light emitting devices 91 has a rectangular shape. For example, the aspect ratio of the light emitting region 92 substantially coincides with the aspect ratio of the corresponding pixel on the illuminated surface 18.

If each of the light emitting devices is a point light source, slight deviation of the position of the corresponding shaping optical element from the light emission point may greatly affect how the light travels in some cases. Using a surface emitting light source whose light emitting region has a certain size reduces the effect of the deviation of the position of the corresponding shaping optical element on how the light travels, as compared to the case where the light emitting device is a point light source. As a result, the alignment of the shaping optical elements can be readily carried out. Further, when each of the light emitting regions 92 has a rectangular shape, the corresponding illuminated region can be readily shaped into a rectangular shape. As a result, pixels having a rectangular shape can be readily formed, and a smooth, high-quality image can be provided accordingly.

Adjacent light emitting regions 92 are spaced apart from each other in the light emitting device array 90. The portion between adjacent light emitting regions 92 in the light emitting device array 90 is a region that does not emit light. An absorber 93 that absorbs light is provided in the non-light-emitting region between adjacent light emitting regions 92. The absorber 93 reduces the amount of light reflection in the non-light-emitting region in each of the light emitting devices 91. The absorber 93 is, for example, formed of a light absorbing resin member.

Providing the non-light-emitting region between adjacent light emitting regions 92 increases the grayscale difference between the corresponding adjacent pixels, whereby an image with sharp contours can be provided. Further, the contrast of the image can be improved by providing the absorbers 93 to reduce the amount of light reflection in the non-light-emitting regions. Moreover, the degree of black floating that occurs when low grayscales are expressed can be reduced by reducing the light reflection in the non-light-emitting regions.

Figure 18:
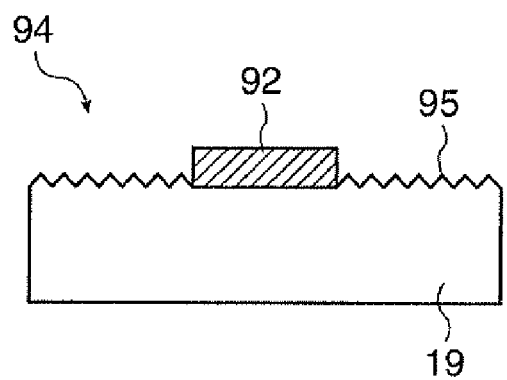
FIG. 18 is a diagrammatic cross-sectional view of a light emitting device according to a variation.

FIG. 18 is a diagrammatic cross-sectional view of a light emitting device 94 according to a variation The present variation is characterized in that each of the absorbers 93 is replaced with a scatterer 95. The scatterer 95 is provided in the non-light-emitting region between adjacent light emitting regions 92. The scatterer 95 scatters the light incident on the non-light-emitting region. The scatterer 95 is formed, for example, by forming minute irregularities on the surface of the substrate 19. Alternatively, the scatterer 95 may be formed by dispersing a scattering material on the surface of the substrate 19. Using the scatterer 95 to scatter the light incident on the non-light-emitting region of each of the light emitting devices 94 allows the amount of stray light to be reduced. In this way, the contrast of an image can be improved.

The entire disclosure of Japanese Patent Application Nos. 2008-190549, filed Jul. 24, 2008 and 2009-140010, filed Jun. 11, 2009 are expressly incorporated by reference herein.

What is claimed is:

1. A projector comprising:
light emitting devices provided in correspondence with pixels that form an image displayed on an illuminated surface, each of the light emitting devices emitting light modulated in accordance with an image signal; and
shaping optical elements provided in correspondence with the light emitting devices, each of the shaping optical elements shaping the region illuminated with the light emitted from the corresponding light emitting device,
wherein the shaping optical elements form a shaped light region in a position on the light path between the shaping optical elements and the illuminated surface, and
wherein an intermediate image is formed on the shaped light region.

2. The projector according to claim 1, further comprising a projection system that projects the light shaped by the shaping optical elements on the illuminated surface, wherein the shaping optical elements form the shaped light region in a position on the light path between the shaping optical elements and the projection system.

3. The projector according to claim 1, wherein the shaping optical elements cause parts of the illuminated regions created by adjacent ones of the light emitting devices to overlap with each other in the position of the shaped light region.

4. The projector according to claim 1, wherein the shaping optical elements create a gap between adjacent ones of the illuminated regions in the position of the shaped light region.

5. The projector according to claim 1, wherein each of the shaping optical elements shapes the corresponding illuminated region in the position of the shaped light region into a rectangular shape.

6. The projector according to claim 1, wherein each of the shaping optical elements converges the light emitted from the corresponding light emitting device.

7. The projector according to claim 1, wherein each of the shaping optical elements diffuses the light emitted from the corresponding light emitting device.

8. The projector according to claim 1, wherein each of the shaping optical elements parallelizes the light emitted from the corresponding light emitting device.

9. The projector according to claim 1, wherein the shaping optical elements are diffraction optical elements that diffract the light emitted from the light emitting devices.

10. The projector according to claim 9, wherein zero-order light, which is non-diffracted light, among the light having exited from each of the diffraction optical elements is directed toward a position outside the illuminated surface.

11. The projector according to claim 10, wherein the principal ray of the light flux having exited from each of the light emitting devices is inclined to the optical axis of the projection system.

12. The projector according to claim 1, further comprising a scatterer provided in the position of the shaped light region, the scatterer scattering the light shaped by the shaping optical elements.

13. The projector according to claim 1, wherein the plurality of light emitting devices are arranged two-dimensionally in a first direction and a second direction substantially perpendicular to the first direction, and
the light emitting devices arranged along adjacent lines spaced apart in the first direction deviate from each other in the second direction, and the light emitting devices arranged along adjacent lines spaced apart in the second direction deviate from each other in the first direction.

14. The projector according to claim 1, further comprising a scan optical system provided in a position on the light path between the shaped light region and the illuminated surface, the scan optical system scanning the light shaped by the shaping optical elements on the illuminated surface.

15. The projector according to claim 1 comprising:
first light emitting devices, which are the light emitting devices that emit first color light;
second light emitting devices, which are the light emitting devices that emit second color light;
third light emitting devices, which are the light emitting devices that emit third color light;
first shaping optical elements, which are the shaping optical elements that shape the regions illuminated with the first color light emitted from the first light emitting devices;
second shaping optical elements, which are the shaping optical elements that shape the regions illuminated with the second color light emitted from the second light emitting devices;
third shaping optical elements, which are the shaping optical elements that shape the regions illuminated with the third color light emitted from the third light emitting devices; and
a color combining optical system that combines the first color light from the first shaping optical elements, the second color light from the second shaping optical elements, and the third color light from the third shaping optical elements.

16. The projector according to claim 1, wherein each of the light emitting devices is a surface emitting light source with a light emitting region that emits light.

17. The projector according to claim 16, wherein the light emitting region has a rectangular shape.

18. The projector according to claim 16, wherein adjacent ones of the light emitting regions are spaced apart from each other, and an absorber that absorbs light is provided between adjacent ones of the light emitting regions.

19. The projector according to claim 16, wherein adjacent ones of the light emitting regions are spaced apart from each other, and a scatterer that scatters light is provided between adjacent ones of the light emitting regions.

20. The projector according to claim 1, wherein the plurality of light emitting devices are arranged in lines on a substrate, and the shaping optical elements are mounted on the substrate.

21. The projector according to claim 6, further comprising a projection system that projects the light shaped by the shaping optical elements on the illuminated surface, wherein the shaping optical elements form the shaped light region in a position on the light path between the shaping optical elements and the projection system.

22. The projector according to claim 6, wherein the shaping optical elements cause parts of the illuminated regions created by adjacent ones of the light emitting devices to overlap with each other in the position of the shaped light region.

23. The projector according to claim 6, wherein the shaping optical elements create a gap between adjacent ones of the illuminated regions in the position of the shaped light region.

24. The projector according to claim 6, wherein each of the shaping optical elements shapes the corresponding illuminated region in the position of the shaped light region into a rectangular shape.

25. The projector according to claim 6 comprising:
first light emitting devices, which are the light emitting devices that emit first color light;
second light emitting devices, which are the light emitting devices that emit second color light;
third light emitting devices, which are the light emitting devices that emit third color light;
first shaping optical elements, which are the shaping optical elements that shape the regions illuminated with the first color light emitted from the first light emitting devices;
second shaping optical elements, which are the shaping optical elements that shape the regions illuminated with the second color light emitted from the second light emitting devices;
third shaping optical elements, which are the shaping optical elements that shape the regions illuminated with the third color light emitted from the third light emitting devices; and
a color combining optical system that combines the first color light from the first shaping optical elements, the second color light from the second shaping optical elements, and the third color light from the third shaping optical elements.

26. The projector according to claim 6, wherein each of the light emitting devices is a surface emitting light source with a light emitting region that emits light.

27. The projector according to claim 6, wherein the plurality of light emitting devices are arranged in lines on a substrate, and the shaping optical elements are mounted on the substrate.

* * * * *